(12) United States Patent  
Lovell, Jr.

(10) Patent No.: US 8,195,210 B2  
(45) Date of Patent: *Jun. 5, 2012

(54) SYSTEM AND METHOD FOR MESSAGE-BASED ACCESS

(75) Inventor: Robert C. Lovell, Jr., Leesburg, VA (US)

(73) Assignee: Sybase 365, Inc., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/171,552

(22) Filed: Jun. 29, 2011

(65) Prior Publication Data

US 2011/0256843 A1     Oct. 20, 2011

Related U.S. Application Data

(63) Continuation of application No. 12/120,327, filed on May 14, 2008, now Pat. No. 8,000,728, which is a continuation of application No. 11/244,065, filed on Oct. 6, 2005, now Pat. No. 7,389,117.

(60) Provisional application No. 60/616,122, filed on Oct. 6, 2004.

(51) Int. Cl.
*H04W 4/00* (2009.01)
*H04M 11/00* (2006.01)

(52) U.S. Cl. ........................ 455/466; 455/405; 455/406

(58) Field of Classification Search ............... 455/466, 455/405, 406

See application file for complete search history.

(56) References Cited

U.S. PATENT DOCUMENTS

| | | |
|---|---|---|
| 7,389,117 B2 * | 6/2008 | Lovell, Jr. ............ 455/466 |
| 2003/0051041 A1 | 3/2003 | Kalavade et al. |
| 2003/0134614 A1 | 7/2003 | Dye |
| 2004/0019539 A1 | 1/2004 | Raman et al. |
| 2004/0137921 A1 | 7/2004 | Valloppillil et al. |
| 2004/0202145 A1 | 10/2004 | Lundin |
| 2004/0203602 A1 | 10/2004 | Karaoguz et al. |
| 2004/0235455 A1 | 11/2004 | Jiang |
| 2004/0248547 A1 | 12/2004 | Philsgard et al. |
| 2005/0021781 A1 | 1/2005 | Sunder et al. |
| 2005/0054325 A1 | 3/2005 | Morper |
| 2005/0086535 A1 | 4/2005 | Ernst et al. |
| 2005/0124288 A1 | 6/2005 | Karmi et al. |

* cited by examiner

*Primary Examiner* — Barry Taylor

(74) *Attorney, Agent, or Firm* — Edell, Shapiro & Finnan, LLC

(57) ABSTRACT

A method and system for providing message-based access to services includes receiving a request message from a mobile subscriber relating to a service that is desired by the mobile subscriber, routing the request message for processing, performing one or more activities in accordance with the requested service, returning a response message to the mobile subscriber, and facilitating/enabling/etc. access to the requested service.

18 Claims, 1 Drawing Sheet

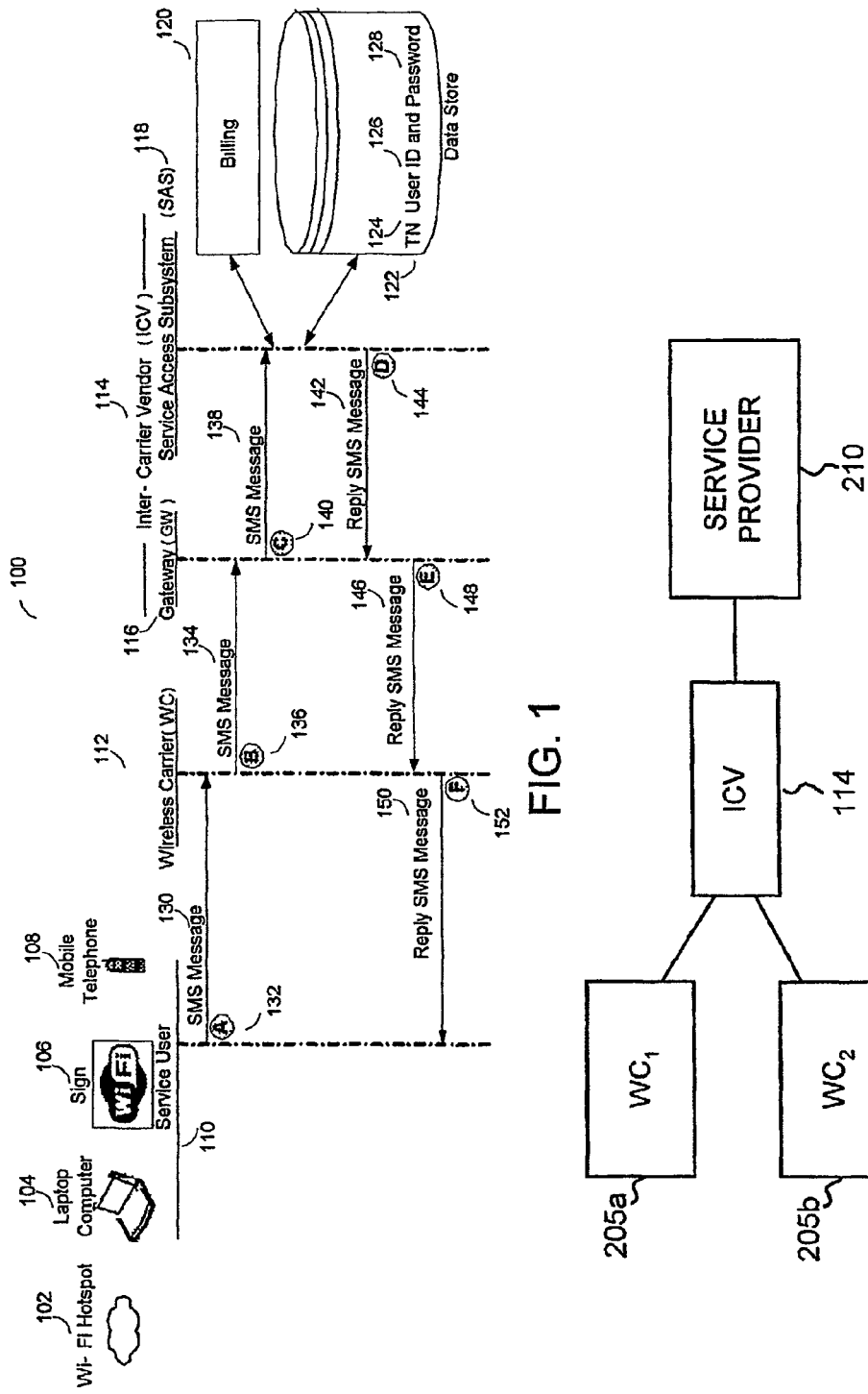

SYSTEM AND METHOD FOR MESSAGE-BASED ACCESS

This application is a continuation of U.S. application Ser. No. 12/120,327, filed May 14, 2008, which is a continuation of U.S. application Ser. No. 11/244,065, filed Oct. 6, 2005, which claims the benefit of U.S. Provisional Patent Application No. 60/616,122, filed on Oct. 6, 2004, all of which are incorporated herein by reference in their entireties.

BACKGROUND

1. Field of the Invention

The present invention relates generally to telecommunications services. More particularly, the present invention relates to the utilization of various wireless messaging paradigms, including, inter alia, Short Message Service (SMS), Multimedia Message Service (MMS), wireless electronic mail (e-mail) and Instant Messenger (IM), to facilitate access to services, including, inter alia, the increasingly popular wireless fidelity (Wi-Fi).

2. Background of the Invention

While the 'wireless revolution' continues to march forward it carries with it a range of untapped, or under-exploited, potentials. As the various technological (e.g., ubiquitous cross-carrier interoperability), social (e.g., user or subscriber inertia), etc. impediments are breached, wireless data services continue to grow and continue to provide significant revenue opportunities to wireless carriers. To sustain that growth a continual stream of new 'singular' wireless data products and services is required.

One such product/service is the immensely popular Wireless Fidelity or Wi-Fi.

Private Wi-Fi environments are frequently deployed by individuals within their homes to provide un-tethered network access within their home. Additionally, private Wi-Fi environments have been, and continue to be, deployed by companies and other organizations within their buildings and campus complexes to provide their employees and workers with wireless network access.

Wi-Fi 'hotspots' or access points have been deployed at a variety of public locations, and new hotspots are being raised at an ever-increasing rate at, amongst other public locations, airports, hotels, conference centers, coffee shops, fast food restaurants, sports stadiums, etc.

As a potential service user moves about from one public location to another it is not always clear or obvious to that user what services may be available at any given location. To address this challenge mechanisms have become available that identify for a potential service user the location, availability, etc. of a desired service.

While mechanisms have begun to appear that identify the location and the availability of services such as public Wi-Fi hotspots, no mechanisms yet exist to address the many challenges that inevitably arise from the fact that each public Wi-Fi hotspot is effectively a separate service 'island,' distinct and apart from other (proximate or distant) Wi-Fi hotspots. Two of the many challenges are (1) payment and (2) access.

The present invention addresses the payment and access challenges and thus aids significantly in the further adoption and use of public Wi-Fi and other services that are similarly situated.

SUMMARY OF THE INVENTION

According to one exemplary aspect, the present invention relates to a method for providing access to a service, comprising receiving a request message from a mobile subscriber relating to a service that is desired by the mobile subscriber, routing the request message for processing, performing one or more processing steps on the request message in accordance with said service including generating a temporary User ID and Password, returning a response message to the mobile subscriber, and facilitating access to the desired service.

According to another exemplary aspect of the present invention, a system is disclosed for facilitating access to a service. The system includes a mobile wireless device, a provider network, an inter-carrier vendor network, and a service. The system is operable to route a request message relating to a service that is desired by the user of the mobile wireless device from the mobile wireless device through the provider network and to an inter-carrier vendor resulting in an appropriate set of processing activities in accordance with the requested service and the dispatch of a response message to the mobile wireless device with the response message facilitating access to the desired service.

These and other features of embodiments of the present invention will be more fully explained below in conjunction with the drawings.

BRIEF DESCRIPTION OF THE DRAWINGS

FIG. 1 is a diagrammatic presentation of an exemplary user experience that may be realized through the instant invention.

FIG. 2 is a schematic diagram illustrating the relative locations of an inter-carrier vendor, wireless carriers and a service provider, in accordance with embodiments of the invention.

DETAILED DESCRIPTION

To better understand the particulars of the present invention consider for a moment the following hypothetical example.

In this example, Alice is a potential service user who is traveling on business and finds herself with an hour of time during which she would like to access her company's e-mail facility from her laptop computer so that she can check for new e-mail messages and manage (respond to, delete) existing e-mail messages.

Nearby Alice notices a posted sign describing the presence of a public Wi-Fi hotspot at her location (any one of, for example, an airport, a hotel, a conference center, a coffee shop, a fast food restaurant, etc.). The sign indicates that one may pay for access to the hotspot (e.g., in one hour increments), and receive credentials for accessing the hotspot, by sending an SMS message to a particular destination address (e.g., a Telephone Number [TN]).

On her mobile telephone Alice composes an SMS message, directed to the indicated destination address and requesting one hour of access to the hotspot, and dispatches the message. Following the successful receipt and processing of Alice's SMS message (described in detail below), Alice receives a reply SMS message thanking her for her use of the hotspot and including a temporary User ID and Password that she may use to access the hotspot.

On her laptop computer Alice enters the temporary User ID and Password that she received in the reply SMS message, gains access to the hotspot, and reaches her company's e-mail facility through the Internet (as made available via the hotspot).

The hypothetical example that was just presented may be better and more fully understood through the following discussion of FIG. 1.

At Step A 132, Alice 110, our potential service user, observes a sign 106 that is posted near her that describes the presence of a Wi-Fi hotspot 102. Alice follows the instructions that are presented on the sign 106, composes on her mobile telephone 108 a request SMS message 130 soliciting one hour of access to the hotspot 102, and dispatches the request SMS message 130. (It is important to note that other wireless messaging paradigms, including inter alia MMS, may be employed as an alternative to SMS; to simplify the description that follows an SMS-based model will be employed.)

The instructions that are presented on the sign 106 may indicate that Alice should address (direct) her request SMS message 130 to a TN, e.g., 703-555-1234.

Alternatively, the instructions that are presented on the sign 106 may indicate that Alice should address (direct) her request SMS message 130 to a Common Short Code (CSC), e.g., 12345. A description of a common (i.e., universal) short code environment may be found in pending U.S. patent application Ser. No. 10/742,764 entitled "UNIVERSAL SHORT CODE ADMINISTRATION FACILITY."

The instructions that are presented on the sign 106 may indicate that Alice should specify in her request message 130 the desired amount of access time in numerical form with a unit of measure (e.g., hour, minute, etc.) qualifier.

At Step B 136, Alice's Wireless Carrier (WC) 112 receives Alice's request SMS message 130, examines the destination address (e.g., the TN or the CSC), identifies the destination address as residing outside of its network, and passes the request message 134 along to its messaging Inter-Carrier Vendor (ICV) 114 for processing.

At Step C 140, a Gateway (GW) 116 at Alice's WC's 112 messaging ICV 114 receives Alice's request SMS message 134. reference is made to pending U.S. patent application Ser. No. 10/426,662, entitled "AN INTERMEDIARY NETWORK SYSTEM AND METHOD FOR FACILITATING MESSAGE EXCHANGE BETWEEN WIRELESS NETWORKS," for a description of a messaging ICV 114 and a summary of various of the services/functions/etc. that are performed by same. This application is incorporated herein by reference.

The use of messaging ICV 114, although not required, provides significant advantages. As shown, for example, in FIG. 2, messaging ICV 114 is disposed between multiple wireless carriers 205a, 205b on one side and a service provider 210 (in this case a Wi-Fi service provider) on the other side. Consequently, as long as the messaging ICV 114 has a relationship with "Alice's" particular wireless carrier, Alice will be able to obtain access to the services offered by service provider 210.

Referring again to FIG. 1, the messaging ICV 114 examines the destination address of the received request SMS message 134, determines that the message should be processed by a Service Access Subsystem (SAS) 118, and appropriately routes the request SMS message 138.

The SAS 118 receives Alice's request SMS message 138 and, possibly amongst other activities, extracts key data elements (e.g., Alice's TN as the source address of the message, the requested amount of access time) from the message, validates the extracted data elements (e.g., is Alice's TN on any 'blacklist' of users who are to be denied service, or is the requested amount of access time structurally correct and reasonable in size?), completes the required billing transaction 120 (this will be further explained below), generates a temporary User ID 126 and Password 128 (or credentials) that are unique to Alice and which are configured to expire/die at the end of the requested access interval, and associates in its internal data store 122 Alice's TN 124 with, at a minimum, the temporary credentials (i.e., User ID 126 and Password 128).

As described above, as part of its processing activities the SAS 118 completes the required billing transaction 120 so that Alice may actually pay for her upcoming access to the hotspot. The billing transaction 120 may take any number of forms including, inter alia:

1) The appearance of a line item charge on the bill or statement that Alice receives from her WC. Exemplary mechanics and logistics associated with this approach are described in pending U.S. patent application Ser. No. 10/837, 695 entitled "SYSTEM AND METHOD FOR BILLING AUGMENTATION," which is incorporated herein by reference. Other ways of line item billing are easily implemented by those skilled in the art.

2) The charging of a credit card or the debiting of a debit card. The particulars (e.g., number, expiration date) of the card that is to be used may be included in the originating SMS message (i.e., the SMS message that Alice composed requesting access to the hotspot, as described above for Step A 132). Alternatively, the particulars of the card that is to be used may be retrieved from an account that Alice established previously through a publicly-available Web site (or other means) that is associated (in some way) with the hotspot service provider.

3) The decrementing of a pre-paid account that Alice established previously through a publicly-available Web site (or other means) that is associated (in some way) with the hotspot service provider.

4) Other means including, inter alia, pre-paid or 'countdown' cards, redemption coupons, etc.

At Step D 144, the SAS 118 constructs a reply SMS message 142 that is addressed to Alice (i.e., to the TN of Alice's mobile telephone) and that contains Alice's temporary User ID 126 and Password 128. The message 142 is dispatched to the ICV GW 116.

The generated reply message 142 may optionally contain an informational message—e.g., 'Thank you for visiting our hotspot!' or 'Please visit one of our other nearby hotspots at . . .', etc. The informational message may be selected statically (e.g., all generated reply messages are injected with the same informational message), randomly (e.g., a generated reply message is injected with an informational message that is randomly selected from a pool of available informational messages), or location-based (i.e., a generated reply message is injected with an informational message that is selected from a pool of available informational messages based on the current physical location of the recipient of the reply message).

The generated reply message 142 may optionally contain advertising—e.g., textual material if an SMS model is being utilized, or multimedia (images of brand logos, sound, video snippets, etc.) material if an MMS model is being utilized. The advertising material may be selected statically (e.g., all generated reply messages are injected with the same advertising material), randomly (e.g., a generated reply message is injected with advertising material that is randomly selected from a pool of available material), or location-based (i.e., a generated reply message is injected with advertising material that is selected from a pool of available material based on the current physical location of the recipient of the reply message).

At Step E 148, the GW 116 at Alice's WC's 112 messaging ICV 114 receives the SAS's 118 reply SMS message 142, examines the destination address (i.e., the TN of Alice's mobile telephone), identifies the destination (i.e., Alice's) WC 112, and appropriately routes the message 146.

At Step F 152, Alice's WC 112 receives the reply SMS message 150, examines the destination address (i.e., the TN of Alice's mobile telephone 108), and delivers the message 150 to Alice's mobile telephone 108. Alice retrieves the temporary User ID 126 and Password 128 from the received SMS message 150 and on her laptop computer 104 enters the temporary credentials to gain access to the hotspot 102.

Although not explicitly depicted in FIG. 1, the hotspot 102 that Alice connects to is in communication, either directly or indirectly, with the SAS 118 (e.g., using any of the numerous publicly available Internet Protocol [IP]-based communication mechanisms, using an SS7-based communication mechanism, etc.) to, amongst other activities, validate the temporary credentials (User ID 126 and Password 128) that are entered by Alice and identify the validity period for those credentials (i.e., at what specific time will those credentials expire or die and Alice's hotspot access cease). It will be readily apparent to one of ordinary skill in the relevant art that this may be accomplished through numerous arrangements or configurations.

Numerous enhancements, extensions, etc. to the model that was just described are easily possible. For example, as a user's access time is about to expire the SAS may dispatch an SMS message to the user (a) politely reminding them of the upcoming expiration of their access time and (b) asking if they would like to purchase another block of access time (at a quantity equal to, or possibly different from, their previous purchase).

It is important to note that the hypothetical example that was presented above, which was described in the narrative and which was illustrated in the accompanying FIG. 1, is exemplary only. It will be readily apparent to one of ordinary skill in the relevant art that numerous alternatives to the presented example are easily possible and, indeed, are fully within the scope of the present invention.

The discussion that was just presented employed two specific wireless messaging paradigms—SMS and MMS. These paradigms potentially offer an incremental advantage over other paradigms, such as e-mail, in that native support for SMS and/or MMS is commonly found on the mobile telephone that a potential service user would be carrying; for example, e-mail may not be available to a consumer until the consumer had established access to a public Wi-Fi hotspot and launched their Web browser or their e-mail client application to reach their e-mail facility. However, it is to be understood that it would be readily apparent to one of ordinary skill in the relevant art that other paradigms such as, inter alia, e-mail and instant messaging (IM), are fully within the scope of the present invention.

While the discussion that was just presented focused on Wi-Fi, it will be readily apparent to one of ordinary skill in the relevant art that the application of the present invention to numerous other services is easily possible and indeed is fully within the scope of the present invention.

The following list defines acronyms as used in this disclosure. TABLE-US-00001 Acronym Meaning CSC Common Short Code GW Gateway ICV Inter-Carrier Vendor IM Instant Messenger IP Internet Protocol MMS Multimedia Message Service SAS Service Access Subsystem SMS Short Message Service TN Telephone Number WC Wireless Carrier Wi-Fi Wireless Fidelity The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A server-based method for providing message-based access to a wireless access point, the server-based method comprising:
   receiving a request message from a Wireless Device (WD) of a Mobile Subscriber (MS), the request message (a) being a first communication indicative of a desire by the MS to gain access to the access point and (b) comprising an indicia of the WD and an indicia of a desired access time;
   performing a plurality of processing steps on the request message including at least (a) generating temporary, time-sensitive User Information (UI) and (b) preserving in a repository an association between the UI and at least the indicia of the WD; and
   returning a response message to the WD, the response message comprising the temporary UI.

2. The server-based method of claim 1, wherein the request message is one of (a) a Short Message Service message or (b) a Multimedia Message Service message.

3. The server-based method of claim 1, wherein the processing steps employ one or more of (a) information previously supplied by the MS and (b) information on the current physical location of the WD.

4. The server-based method of claim 1, wherein the processing steps include a billing transaction.

5. The server-based method of claim 4, wherein the billing transaction includes one of (a) the generation of a line-item charge for inclusion on a telephone bill for the MS, (b) the charging of a credit card, (c) the debiting of a debit card, or (d) the decrementing of a pre-paid account.

6. The server-based method of claim 1, wherein the temporary, time-sensitive UI comprises (a) a user ID and (b) a Password.

7. The server-based method of claim 1, wherein the response message is one of (a) a Short Message Service message or (b) a Multimedia Message Service message.

8. The server-based method of claim 1, wherein the response message further comprises one of (a) an informational message or (b) an advertisement.

9. The server-based method of claim 1, further comprising:
   responsive to an approaching expiration of the temporary, time-sensitive UI, dispatching a reminder message to the WD.

10. A processor-based system on a server configured to provide message-based access to an access point, the processor-based system comprising:

a first server-based gateway configured to receive a request message from a Wireless Device (WD) of a Mobile Subscriber (MS), the request message (a) being a first communication indicative of a desire by the MS to gain access to the access point and (c) comprising an indicia of the WD and an indicia of a desired access time;

server-based processing logic configured to perform a plurality of processing steps on the request message including at least (a) generating temporary, time-sensitive User Information (UI) and (b) preserving in a repository an association between the UI and at least the indicia of the WD; and a second server-based gateway configured to return a response message to the WD, the response message comprising the temporary UI.

11. The processor-based system of claim 10, wherein the processing steps employ one or more of (a) information previously supplied by the MS and (b) information on the current physical location of the WD.

12. The processor-based system of claim 10, wherein the processing steps include a billing transaction.

13. The processor-based system of claim 12, wherein the billing transaction includes one of (a) the generation of a line-item charge for inclusion on a telephone bill for the MS, (b) the charging of a credit card, (c) the debiting of a debit card, or (d) the decrementing of a pre-paid account.

14. The processor-based system of claim 10, wherein the temporary, time-sensitive UI comprises (a) a user ID and (b) a Password.

15. The processor-based system of claim 10, wherein the response message is one of (a) a Short Message Service message or (b) a Multimedia Message Service message.

16. The processor-based system of claim 10, wherein the response message further comprises one of (a) an informational message or (b) an advertisement.

17. The processor-based system of claim 10, further comprising:

a third server-based gateway configured to dispatch, responsive to an approaching expiration of the temporary, time-sensitive UI, a reminder message to the WD.

18. The processor-based system of claim 10, wherein the request message is one of (a) a Short Message Service message or (b) a Multimedia Message Service message.

* * * * *